WIDE-ANGLE, ENERGY RESPONSIVE SCANNING SYSTEM

Filed June 25, 1953 3 Sheets-Sheet 1

INVENTOR.
ROY C. HOPGOOD
BY Mitchell & Bechert
ATTORNEYS

WIDE-ANGLE, ENERGY RESPONSIVE SCANNING SYSTEM

Filed June 25, 1953 3 Sheets-Sheet 2

INVENTOR.
ROY C. HOPGOOD
BY Mitchell & Bechert
ATTORNEYS

Nov. 11, 1958 R. C. HOPGOOD 2,859,652

WIDE-ANGLE, ENERGY RESPONSIVE SCANNING SYSTEM

Filed June 25, 1953 3 Sheets-Sheet 3

INVENTOR.
ROY C. HOPGOOD
BY Mitchell & Bechert
ATTORNEYS

United States Patent Office 2,859,652

Patented Nov. 11, 1958

2,859,652

WIDE-ANGLE, ENERGY RESPONSIVE SCANNING SYSTEM

Roy C. Hopgood, Glen Ridge, N. J., assignor to Servo Corporation of America, New Hyde Park, N. Y., a corporation of New York Application June 25, 1953, Serial No. 364,075

21 Claims. (Cl. 88—1)

My invention relates to optical scanning means and to radiation-responsive means utilizing such optical scanning. This invention represents improvement over and refinement of certain aspects of the structure disclosed in the copending patent application of Henry Blackstone and Frank G. Willey, Serial No. 320,272, filed November 13, 1952.

It is an object of the invention to provide improved means of the character indicated.

It is another object to provide improved means for continuously and automatically scanning a field of view for varying energy levels in such field.

It is a further object to provide improved display means for scanning means of the character indicated.

It is also an object to provide an optical-scanning mechanism of such elemental simplicity and smooth operation that noise attributable to moving parts in the scanning mechanism shall have minimum effect upon sensitive elements utilizing the scanning mechanism.

It is a specific object to meet the above objects with a device having an inherently wide angle of view about the scanning axis.

A further specific object is to provide simple means for readily converting a relatively narrow-angle scanner into a wide-angle scanner of the character indicated.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a diagram schematically illustrating component parts of a device incorporating features of the invention;

Figs. 2 and 2*a* are enlarged diagrammatic sectional representations of alternate energy-responsive configurations for use in the device of Fig. 1;

Briefly stated, my invention contemplates the special employment of energy-responsive elements and associated display means with rotary optical scanners of the type discussed in greater detail in the above-identified patent application of Blackstone et al. Such scanners employ one or more optical focusing elements mounted for rotation about a scanning axis other than the optical axis and spaced from the scanning axis sufficiently to focus substantially on the scanning axis. Energy-responsive means at the focus develop a video signal representative of the scanned field of energy, as a function of the angular development of the scan.

In accordance with the invention, I provide a plurality of different sensitive areas in closely spaced adjacency in the energy-responsive means, so that one such area may respond to scanned energy in a first angular field of view, while another such area responds to scanned energy in another field of view. Two such fields of view may be widely spaced or adjacent, depending upon particular requirements, and signal-processing means associated with the display may include a switch or commutator synchronized with scan movement, in order that the commutated output utilized for display purposes may always reflect the video signal developed by the correct sensitive area.

In one form to be described, a scanner, which in said copending application would have had an inherent field-width limitation of 60 degrees, is caused to produce a 120-degree field of view merely by appropriate employment of multiple sensitive areas and associated circuitry in the energy-responsive means. In another form, a 180-degree field of view is obtainable, and in still another general form a full 360-degree azimuth field may be developed.

Figures 1, 2, 3:
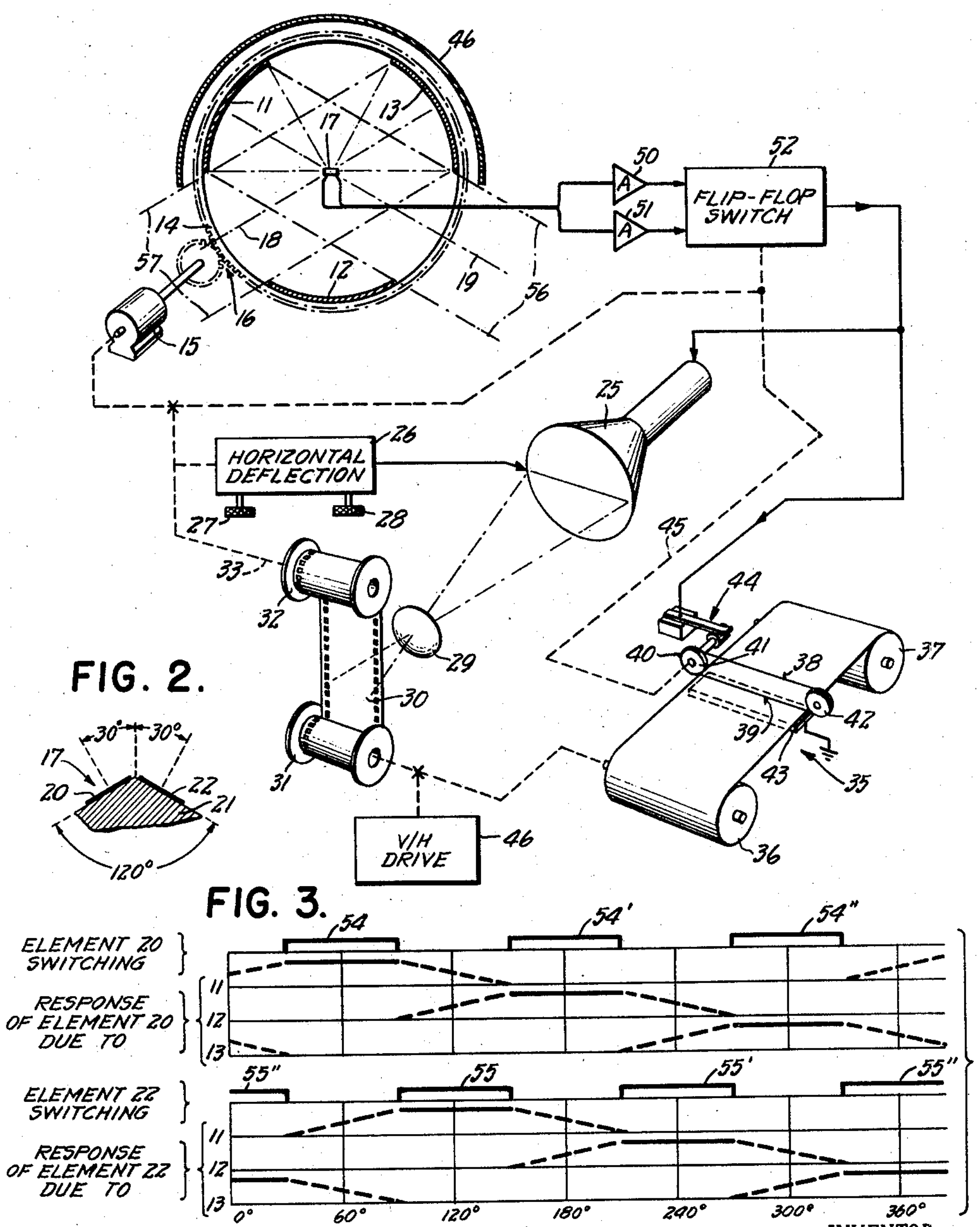
Fig. 3 is a graphical representation of the functioning of the device of Fig. 1.

Referring to Figs. 1 to 3 of the drawings, my invention is shown in application to optical scanning means of the type disclosed in greater detail in said Blackstone et al. application. The scanner may thus comprise a plurality of like focusing elements 11—12—13, which may be glass lenses, but which, in the form shown, are focusing mirrors, fixed to a common support means 14 in equal angularly spaced relation. The support 14 may be a drum mounted for rotation about a central scanning axis and driven continuously by motor means 15 through a peripheral gear drive 16. The scanning axis should be other than the optical axis of the elements 11—12—13, and, for the arrangement shown, all optical axes are substantially in a common radial plane about the scanning axis. Energy-responsive means 17 may be relatively fixedly supported by means not shown, for permanent orientation independent of rotation of the scanner drum 14.

The useful field of view of the scanner of Fig. 1 would have been 60 degrees if the energy-responsive means 17 were of the character disclosed in the said Blackstone et al. application. In said application, the energy-responsive means comprised a single sensitive area at the focus of the optical elements and, because the optical elements were mirrors, such sensitive areas faced backwards, in the sense that the scanner as a whole looks forward toward the field to be scanned. In the case of Fig. 1, however, the energy-responsive means includes a plurality of closely adjacent sensitive areas spaced about the scanning axis and yet located substantially at the scanning axis and, therefore, at the focus or foci of the optical means. The plurality of sensitive areas in Fig. 1 happens to be two, and I develop with such structure an effective angular field width or coverage of 120 degrees about the scanning axis; this width of field is developed in the drawing between optical-axis limits designated 18 for the left-most extreme, and 19 for the right-most extreme of the field.

For the configuration shown, each sensitive area may be utilized substantially only to reflect a 60-degree fragment of the total scanned field; and because, in the form shown, it is desired that the two fragmentary 60-degree fields shall be adjacent, to produce a 120-degree field, the central axis for each sensitive area (i. e. the axis on which said area may be said to face radially of the scanning axis) is preferably 60 degrees from the other such central axis. Thus, the energy-responsive means 17 may be of the general character shown in either Fig. 2 or 2*a* and, of course, depending upon the radiation to which the device must respond, various types of sensitive element or area may be preferred.

For infra-red detecting purposes, particularly for response into the further regions of the infra-red, and also for ruggedness and general reliability, I prefer to employ sensitive areas of thermistor-flake material. Such flakes have elsewhere been described in detail and, for the present purposes, it will suffice merely to indicate in Fig. 2 that one sensitive area or flake 20 may be mounted on one face of a mounting block or thermal sink 21, while another sensitive element or area 22 may be similarly mounted on another face of the same sink 21. As indicated above, these areas preferably face along radial axes substantially 60 degrees apart and, therefore, they are shown mounted on a corner of block 21 having an included angle of 120 degrees. The size of the sensitive areas will depend upon performance requirements, but ordinarily the size can be made small compared with, or of the order of magnitude of, the limit of resolution of the optics. I prefer that the elements 20—22 shall be so closely placed with respect to each other that an optical element may, at the instant when it is symmetrically placed with respect to both sensitive areas 20—22, focus equal quantities of energy on both sensitive elements 20—22; stated in other words, the combined effective spread of both sensitive elements 20—22 at such instant of symmetry with respect to the focusing element, is preferably the order of magnitude of the limit of resolution of such focusing element.

Figure 2A:
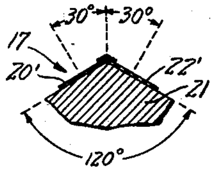

In Fig. 2*a*, I suggest that a single sensitive flake may be formed with a central crease so as to expose two surfaces 20′—22′ for the sensitive areas; an electrically conductive optical barrier 23, such as a coating of Aquadag, may be applied to the crease, so as to segregate the sensitive areas and to provide a means for separate electrical connection to the separate sensitive areas. Operation will otherwise be as for the Fig. 2 arrangement.

The display means utilizing the response of means 17 may also be of the general character disclosed in greater detail in said Blackstone et al. application except, of course, that the displayed field width will be 120 degrees, rather than 60 degrees. Thus, the signal-processing means associated with the energy-responsive means 17 may include appropriate preamplifiers mounted closely adjacent the sensitive areas 20—22, but schematically indicated at 50—51. Also, the display means may include a cathode-ray tube 25, responsive to the video output of the energy-responsive means 17, and producing an intensity-modulated line development, horizontally across the face of the tube, the full horizontal sweep reflecting the full field of view of the scanner; it will be understood that the deflection amplifier 26 for the horizontal sweep is driven in synchronism with the scanning mechanism and that it may include first adjustable means 27 for expanding the sweep, and further adjustable means 28 for biasing the sweep, so that any desired limited sector of the wide field of view may be examined in greater detail, if necessary. The cathode-ray tube 25 may include scan-depression (vertical sweep means) means in order to develop an integrated "picture" or frame on the face of the tube, or, as shown, focusing optics 29 may project successive scan lines onto a recorder film 30, fed from a supply spool 31 and propelled by a take-up or drive spool 32. If desired, a further take-off from the basic drive may be utilized to synchronize film advance with scanning rate, as suggested by the dashed lines 33.

In addition to the described display means, or as an alternative, a permanent record may be instantaneously developed through the employment of a stylus-operated recorder 35 having a take-up reel 36 and a supply reel 37 for moving a continuous strip of electrically sensitive recording paper past transversely moving styli 38—39—40. All styli are shown mounted on a continuous band between spaced pulleys 41—42 and arranged so that at any one time only one stylus is able to create a video discharge through the paper to a grounded platen 43. The video signal for application to recorder 35 is shown to be applied to the styli by means of a slip ring or brush configuration 44, and the drive to the styli is, of course, synchronized with scanning rotation, as suggested by the dashed lines 45.

For aerial-reconnaissance applications, wherein the scanner is oriented to scan transversely of the flight axis and in a downwardly oriented scanning field, it is desirable that film or recorder advance be synchronized with the V/H rate of the aircraft, and I have suggested this schematically at 46. It will be understood that for such applications the V/H control will dominate the film-transporting or recorder drive, to the exclusion of the synchronism suggested at 33.

The signal-processing means for such display devices as at 25 or at 35 may be of generally conventional construction and may involve preamplifier means 50—51 mounted preferably as closely as possible to the energy-responsive capsule 17. Such amplifier means may be separately provided for each of the sensitive areas, it being understood that such amplifiers may be connected in separate bridge circuits, in which for each of the sensitive areas 20—22 comparison is made against a reference sensitive area that is subjected only to ambient conditions, as described more fully in the said Blackstone et al. application. For the present wide-angle purposes, it is desired to use the video output of amplifier 50 only for a given fraction of the scanning cycle, while the output of amplifier 51 is utilized for only another fraction of said cycle. I have, therefore, provided switching means 52 to commutate the two amplifier outputs so that a single video signal may be supplied to the one or more display devices used. The switching means 52 may include a so-called flip-flop circuit synchronized with scan rotation, as suggested by the dashed-line connections to the scanning drum.

A better understanding of the cycle of operation of my scanner will be had from Fig. 3, in which I display separately, as functions of rotation of scanner 14 (i. e. as functions of time), the responses of the separate sensitive areas 20—22 to energy collected by the several optical systems 11—12—13. I also indicate at 54—55 the alternating commutating functions of the switching means 52.

In Fig. 1, parts are displayed at a time when the scanning head has rotated 30 degrees from the origin depicted in Fig. 3. During this 30-degree movement, the scanner 14 has rotated, say, clockwise, and the optical system 11 has come fully into the beginning of the first wide-angle sweep or scan line, so that a maximum spread of incoming parallel rays (as suggested by the limiting rays 56) may develop a full response in sensitive element or area 22, for the ensuing 60 degrees of movement, i. e. following the instant depicted in Fig. 1. In approaching the event of Fig. 1, optical system 11 will have been brought past the limiting edge of the window or shield 46, and I have illustrated the resultant response build-up in element 20 by a gradual 60-degree-wide development of the response in the second curve of Fig. 3. The response of sensitive area 20 to energy collected by optics 11 will continue at full strength for a full 60-degree sweep and, therefore, during this time, I arrange for the switching means 52 to be "on" as far as the video output from amplifier 51 is concerned—all as suggested by the square-wave function characterising the first curve of Fig. 3. Switch 52 will thus be "on" for the first interval 54, that is, from the 30-degree point to the 90-degree point, to cause mirror 11 to produce (through sensitive element 20) the only video response during this period. At the 90-degree position, representing one-half the scanned wide-angle field, switch 52 is thrown automatically, so that the square-wave function 55 may thereafter characterize connection of the video output of amplifier 50 (sensitive area 22) to the display means. During the interval of square-wave 55, the scanner advances from the 90-degree position to the 150-degree position, and it will be seen from the sixth curve of Fig. 3 that the display means then reflects the response of sensitive element 22 to optics 11, so as to complete the full scanned field.

By the time that optical element 11 has scanned the full wide-angle field of view in the described manner, switching means 52 reverts to its former position, connecting the video output of amplifier 51 to the display means, and I have identified the 60-degree period of this operation by the reference character 54′. At commencement of the switching interval 54′, optics 12 will have assumed the position shown for optics 11 in Fig. 1, so that the then-commutated response of sensitive area 20 will reflect energy collected by the optics 12. The potential response of sensitive area 20 during this period is indicated in the third curve of Fig. 3, and the scanner will have been brought to the 210-degree position at the close of switching interval 54′.

The remainder of the scanning cycle will follow the same general pattern as already described, because switching means 52 will next be switched to the position of commutating the output of element 22 for the interval designated 55′, so as to utilize energy collected by the optics 12 for the second half of the angular-field development. The cycle is completed upon two further similar alternations of switching means 52 for intervals designated 54″ and 55″, during which intervals optics 13 collects energy over a first 60 degrees in the field for focusing on element 20, and over the second 60 degrees in the field for focusing on element 22. It will be seen that for a full development of the scanning cycle, that is, for one rotation of the drum 14, the wide-angle field is scanned three times. During this period, the stylus 38 will have made a single pass across the recorder paper, and the styli 39—40 will also have made single passes, appropriately delayed to produce three coordinated scanning lines on the recorder paper, to depict a 120-degree field development in each case. The same will also have been true of line developments on the film 30 because, as indicated above, the scanning width and timing for deflection amplifier 26 preferably coincides with 120 degrees, or one-third of the scanner cycle.

Figures 4, 5:
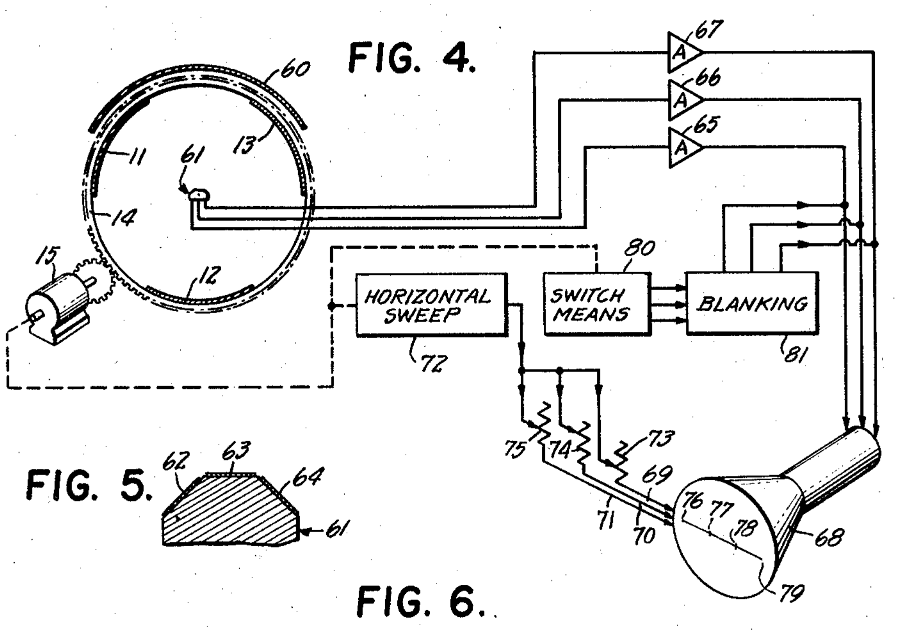
Fig. 4 is a view similar to Fig. 1, but illustrating a modified wide-angle scanning mechanism and associated display means.
Fig. 5 is a view similar to Figs. 2 and 2*a*, but illustrating energy-responsive means for the device of Fig. 4.

In Figs. 4 and 5, I illustrate a modification of the described wide-angle apparatus, in order to produce an even greater development of wide-angle scanning. In Fig. 4, the angular coverage is a full 180 degrees and may be achieved through the use of the same three-mirror scanner as described in Fig. 1, except that the shield 60 has necessarily been reduced in effective width, and one more sensitive element or area has been added to the energy-responsive means 61. Because of the similarity of structure between the two figures, corresponding reference numerals are employed to designate the corresponding parts.

Since the three-mirror system of Figs. 1 and 4 is particularly adaptable to the coverage of 60 degrees of field width for each sensitive area in the energy-responsive means, I have employed three such areas 62—63—64 in the means 61. Each of these areas will be understood to be preferably of the character indicated for areas 20—22 in the form of Figs. 1 and 2, and may thus be associated with suitable reference elements (not shown) and connected in bridge circuits (also not shown), but producing three discrete video outputs to separate amplifying or other signal-processing means 65—66—67. The display means may be a paper-strip recorder, as at 35 in Fig. 1, and appropriately modified to handle the developed video signals, but in Fig. 4 I have illustrated employment of a three-gun cathode-ray tube 68 having separate grid connections for producing intensity-modulated beams in accordance with the separate video outputs of amplifiers 65—66—67.

Each of the guns of the tube 68 may have its own horizontal-deflection system, as indicated schematically by the three horizontally developed leads 69—70—71, and a single horizontal-sweep generator 72 may develop the necessary signals for supply to the several deflection systems. I have suggested at 73—74—75 that individually adjustable potentiometers may be tapped to the output of sweep generator 72 in order to generate the correct magnitudes of sweep potentials applied to the separate deflection systems for each of the three guns in tube 68, so that, for example, the sweep lead 69 may produce deflection potentials accounting for a first 60 degrees of swept field, say, from location 76 to location 77 for the first gun; similarly, the other deflection leads 70—71 may separately account for the necessary sweep potentials on the other two guns, so as to produce coverage of the second and third elements (77—78 and 78—79) of the full 180-degree developed field of scan portrayed on the cathode-ray tube 68.

In order that the intensity modulations appearing on the face of tube 68 shall reflect only full directly utilizable response of the various sensitive areas 62—63—64 to each of the optical system 11—12—13, I provide switching means 80 including a blanking circuit 81, synchronized with the scanning drive and effectively cutting off beam development in the respective guns of tube 68 for all except the desired intervals. The full sequencing cycle for response of the several sensitive areas 62—63—64 to the various optical elements 11—12—13 is developed in Fig. 6 and, because of the similarity of Fig. 6 to Fig. 3, no further description of Fig. 6 is deemed necessary, it being fully and clearly indicated when each element of the intensity-modulated display is presented and accounted for.

Figures 7, 8, 9:
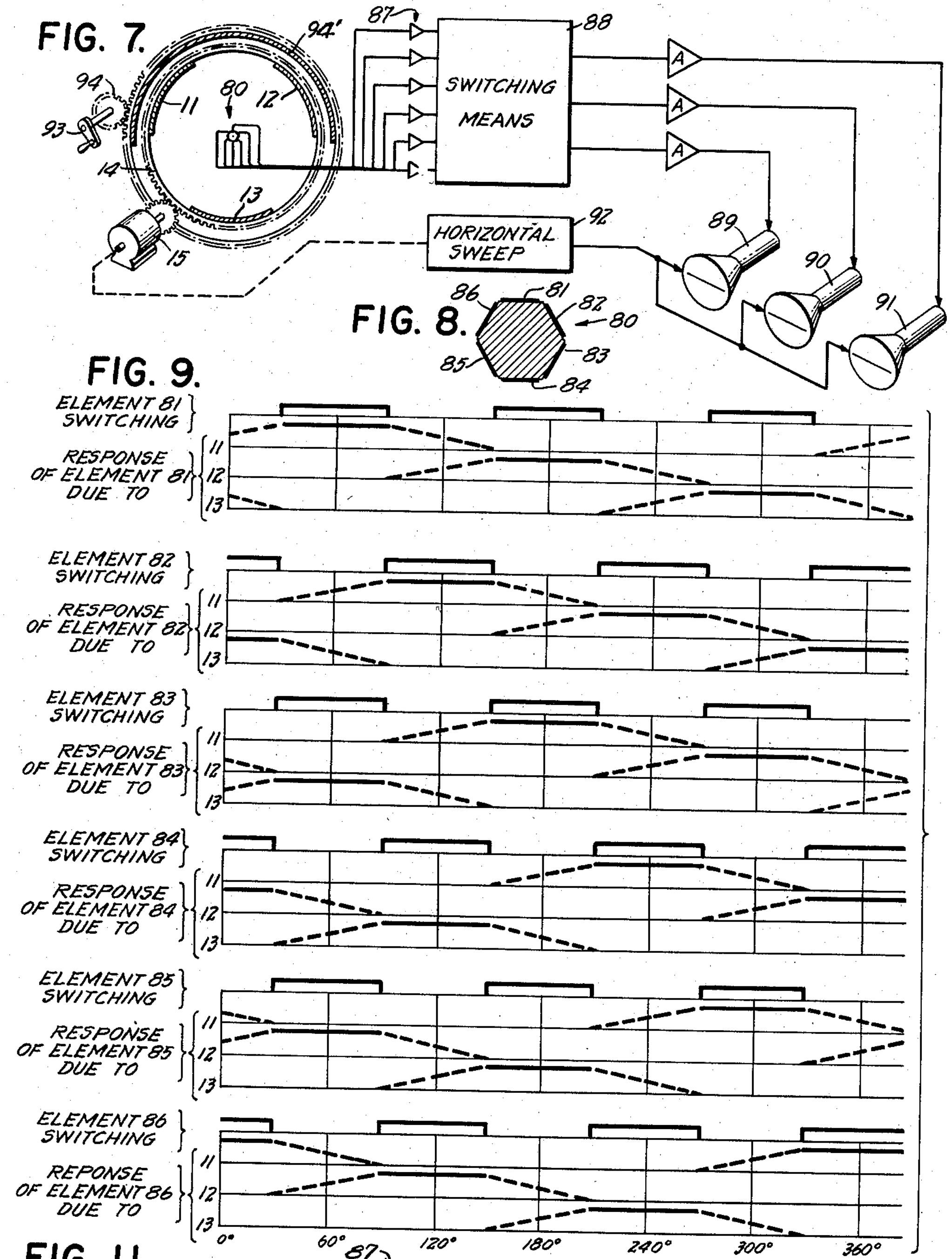
Fig. 7 is a view similar to Fig. 1, illustrating a further wide-angle embodiment of the invention.
Fig. 8 is an enlarged sectional view of an energy-responsive means for the device of Fig. 7.
Fig. 9 is a graphical representation of functioning of the device of Fig. 7.

In Fig. 7, I show a further modification of my wide-angle scanning mechanism and adapted to scan a full 360 degrees of azimuth about the scanning axis. This wide angle of coverage may be developed by a single optical element in the scanner and by various pluralities of optical elements, but, in the form shown, I have utilized the same scanner 14 as described for other configurations. The scanner 14 may be continuously driven about fixed energy-responsive means 80 and, for the three-mirror configurations shown, wherein each mirror has an effective angular coverage of 60 degrees, I employ six equally spaced, closely adjacent sensitive areas 81—82—83—84—85—86 in the single capsule constituting the energy-responsive means 80. Again, reference elements (not shown) in bridge circuits (also not shown) may provide separate outputs for each of the sensitive areas to preamplifiers designated generally 87, so that the signal level may be sufficiently high in each of the six channels for treatment in switching means 88, which is shown synchronized with the scanning drive.

The display means of Fig. 7 may be of various forms, depending upon the desired utilization of the developed information, and I have shown three separate cathode-ray tubes 89—90—91 receiving, in each case, commutated video signals reflecting two adjacent sensitive-area responses; thus, for example, the video signal commutated by switch 88 for supply to the intensity-modulation grid of tube 89 may reflect responses of adjacent elements 81—82 in a manner completely analogous to that described for elements 20—22 of Fig. 1, in order to cover a first 120 degrees of scanned field. The next cathode-ray tube 90 may similarly reflect the responses of sensitive areas 83—84 and thus display a second 120-degree fragment of the scanned field. Lastly, the cathode-ray tube 91 may receive commutated video signals reflecting the response of elements 85—86 to provide the final 120-degree coverage necessary to complete the full 360-degree field width. All cathode ray tubes 89—90—91 may be fed with the same horizontal sweep signals (provided by generator 92) and synchronized with the scanning drive, as will be understood. The three separate displays on tubes 89—90—91 may be scan-depressed to provide direct monitoring over desired field sectors or, if no vertical deflection is employed, a continuously moving film recorder of the type described in Fig. 1 may be employed for each or, in common, for all of the display tubes.

Figure 6:
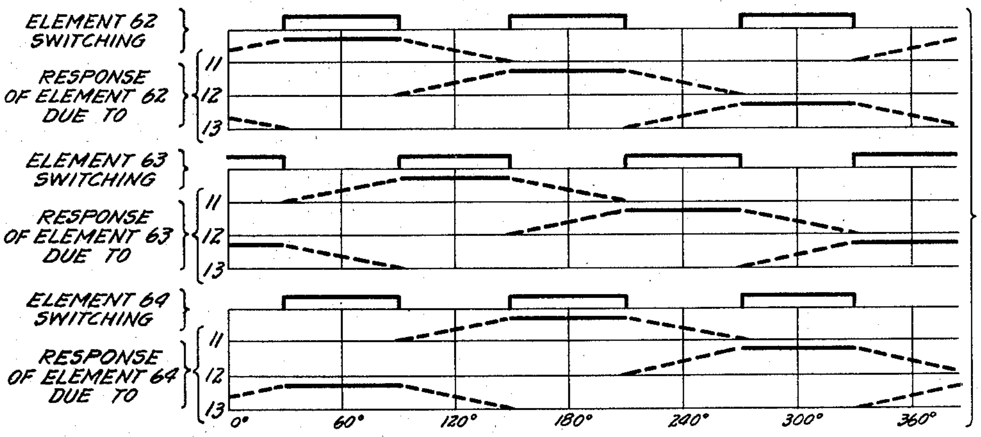
Fig. 6 is a graphical representation of functioning of the arrangement of Fig. 4.

Fig. 9 is a graphical representation along the lines of Figs. 3 and 6 to display the succession of events for a full 360-degree cycle of operation, and illustrating the switching functions at 88 to provide the desired commutation of responses of the several sensitive areas. In view of the descriptions given for Figs. 3 and 6, no further description of Fig. 9 is deemed necessary, it being understood that, for each 360 degrees of rotation of scanner 14, the elements of three successive 360-degree scan lines will be developed on the appropriate display faces of tubes 89—90—91.

Thus far, the 360-degree scanner of Fig. 7 has been described without shield means, because in many cases, radiation entering the scanner during undesired intervals will be "commutated out" or at least rejected by the switching sequence. For applications in which such radiation becomes a source of serious degradation of the desired video signals, I may employ a shield 94′ shown mounted for rotation about the scanning axis, independently of scanner rotation. Manual means 93 may be coupled (at 94) to shield 94′, in order to position the same and thus effectively to determine the direction in which the scanner faces. In such an arrangement, an otherwise completely stationary scanner mount may be easily "trained" in azimuth (about the scanning axis) and yet always display the full 120-degree or 180-degree field permitted by the window opening in the shield, the azimuth of the instantaneous field being of course solely determined by the manual setting at 93.

Figure 10:
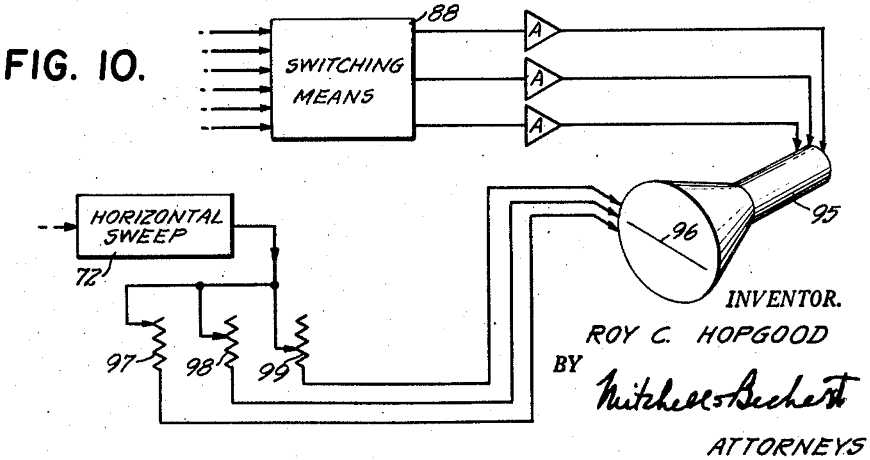
Figs. 10 and 11 illustrate alternative display means for certain portions of the device of Fig. 7.

Fig. 10 displays an alternative for certain elements in Fig. 7 so that, if desired, a single display means, such as a three-gun cathode-ray tube 95, may portray the full 360-degree scanned field. For gun-flash-indicator applications it may be desirable to provide a circular sweep for the intensity-modulated display (i. e. three continuous 120-degree arcs); however, in the form shown the full 360-degree field is displayed on a single line 96. Thus, the three commutated outputs of switching means 88 may be separately fed to the three intensity-modulation grids of the guns of tube 95, and separate horizontal deflection signals may be provided for these guns and appropriately biased for proper succession along the 360-degree line 96, as suggested by potentiometers 97—98—99. It will be clear that the display means of Fig. 10 may be adapted to a vertical scan depression, so as to develop a "map" of the scanned field for direct interpretation; alternatively, or additionally, other means described in more detail in Fig. 1, may produce a permanent record of the developed information.

Figure 11:
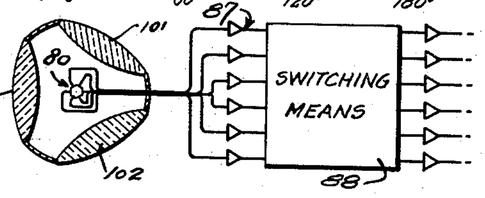

In Fig. 11, I illustrate employment of lenses in the optical scanner for a 360-degree system of the type described in Figs. 7 and 10. The lenses 100—101—102 of Fig. 11 may be equally angularly spaced about the scanning axis and driven continuously (by means not shown) about the energy-responsive capsule 80. For infra-red applications, the material of lenses 100—101—102 may be silver chloride, arsenic trisulphide, or otherwise suitable to the passage of the radiation, and because no radiation impinges upon the capsule 80 except that required for commutation (in accordance with the chart of Fig. 9), there will be substantially less degradation of video signals than may be characteristic of the above-discussed unshielded mirror situation in Fig. 7.

It will be seen that I have described basically simple means for producing wide-angle coverage of a scanned field with optical systems of the character indicated. As long as the sensitive elements are sufficiently small and sufficiently closely spaced that the limit of resolution of the optical systems can be spread over adjacent sensitive elements, there is no degradation of the developed signals occasioned by the multiplicity of sensitive elements and, therefore, as indicated by the case of 360-degree coverage, there is no limit to the angular field which can be covered with my arrangements. Since the invention is applicable to scanning mechanisms of the general character described in other applications, it will be clear that when wide-angle coverage is required, it may be built into existing narrow-angle systems with a minimum of modification.

While I have described my invention in detail for the preferred forms illustrated, it will be understood that modifications may be made within the scope of the invention as defined in the claims which follow.

I claim:

1. Optical-scanning means, comprising two closely adjacent relatively fixedly mounted energy-responsive elements, optics including a focusing element mounted for rotation about said elements and about an axis substantially transverse to the axis of said focusing element, said energy-responsive elements being supported substantially at said rotation axis and facing in different angular directions therefrom, and said optics being focused substantially on said axis, whereby during at least a part of a cycle of rotation of said focusing elements about said energy-responsive means energy collected thereby may be simultaneously focused on both said energy-responsive elements, display means, and means synchronized with rotation of said optics for commutating the respective outputs of said elements to said display means, whereby during rotation of said focusing element and while imaging radiation on said energy-responsive elements, said display means may display the output of one of said energy-responsive elements in alternation with the output of the other energy-responsive element in the same relatively extensive scanned line.

2. Optical-scanning means, comprising focusing optics mounted for rotation about an axis substantially inclined to the axis of said focusing optics, energy-responsive means including two relatively fixedly mounted adjacent sensitive elements located substantially on said axis of rotation, said optics being rotatable about said sensitive elements, said elements being inclined with respect to each other so as to face said optics for different angularly spaced predominant portions of the scanning cycle of said optics, display means, and means including a switch synchronized with rotation of said optics for alternately commutating the respective outputs of said elements to said display means, whereby during rotation of said optics and while imaging radiation on said sensitive elements, said display means may display the output of one of said sensitive elements in alternation with the output of the other of said sensitive elements in the same relatively extensive scanned line.

3. Optical-scanning means, comprising optics including a focusing element mounted for rotation about an axis substantially transverse to the axis of said focusing element, drive means for continuously rotating said element about said axis, relatively fixedly mounted energy-responsive means including two sensitive surfaces inclined less than 180 degrees with respect to each other and located substantially at said rotation axis, said focusing element being focused substantially on said axis and rotatable about said surfaces, whereby for one portion of a rotation of said optics said focusing element may be focused primarily on one of said energy-responsive surfaces and for another portion of the same rotation thereof said focusing means may be focused primarily on the other of said energy-responsive surfaces, there being a region of overlap in response of said energy-responsive surfaces to energy collected by said focusing means, whereby during a single rotation of said focusing element, energy collected by one of said energy-responsive surfaces may substantially continuously reflect the scan of said focusing element over a first angular field and energy collected by said other energy-responsive element may substantially continuously reflect the scan of another angular field.

4. Scanning means according to claim 3, in which said angle between energy-responsive elements is substantially 60 degrees.

5. Scanning means according to claim 3, in which said optics includes three like focusing elements angularly spaced about said axis of rotation.

6. Optical line-scanning means, comprising relatively fixed energy-responsive means including a plurality of small sensitive areas in close adjacency and in equal angularly inclined relationship, each said area developing an electrical output for variation in incident radiation, and optics including a plurality of angularly spaced focusing elements mounted for unitary rotation about said sensitive areas and about a rotary axis passing substantially through said energy-responsive means, said focusing elements being focused substantially on said energy-responsive means, the incremental angular inclination of the central axes of said elements with respect to each other being substantially equal to 360 degrees divided by the number of said focusing elements, whereby each focusing element may develop a first line of video signal in one sensitive area and an adjacent line of video signal in an adjacent sensitive area, display means, and commutating means synchronized with rotation of said optics and coupling said display means alternately to said one and to said adjacent sensitive areas.

7. Optical line-scanning means, comprising relatively fixed energy-responsive means including two small sensitive areas in close adjacency and in angularly inclined relationship, each said area developing an electrical output for variation in incident radiation, and optics including three equally angularly spaced focusing elements mounted for unitary rotation about said sensitive areas and about a rotary axis passing substantially through said energy-responsive means, said focusing elements being focused substantially on said energy-responsive means, said sensitive areas facing in directions substantially 60 degrees apart, whereby each focusing element may develop a first line of video signal in one sensitive area and a second line of video signal in the other sensitive area, display means, and commutating means synchronized with rotation of said optics and coupling said display means alternately to said one and to said adjacent sensitive areas, whereby continuous coverage of substantially a 120-degree field width may be achieved.

8. Optical line-scanning means, comprising relatively fixed energy-responsive means including three small sensitive areas in close adjacency and in equal angularly inclined relationship, each said area developing an electrical output for variation in incident radiation, and optics including three equally angularly spaced focusing elements mounted for unitary rotation about said sensitive areas and about a rotary axis passing substantially through said energy-responsive means, said focusing elements being focused substantially on said energy-responsive means, said sensitive areas facing in directions substantially 60 degrees apart, whereby each focusing element may develop a first line of video signal in one sensitive area and a second line of video signal in another sensitive area and a third line of video signal in the third sensitive area, display means, and commutating means synchronized with rotation of said optics and sequentially coupling said display means to said adjacent sensitive areas, whereby continuous coverage of substantially a 180-degree field width may be achieved.

9. In combination, an optical line scanner comprising an optical element mounted for rotation and focused substantially on an axis of rotation, said axis of rotation being substantially inclined from the axis of said element, energy-responsive means substantially on said axis and supported independently of rotation of said optics, said energy-responsive means including two sensitive areas in close adjacency and facing on predominant axes radiating from said rotation axis in angularly spaced relation, each said sensitive area developing an electrical output for variation in radiation incident thereon, whereby during a single rotation said focusing element may be successively focused upon said sensitive areas, display means, and switching means synchronized with rotation of said focusing elements and alternately coupling said display means to the outputs of said areas, whereby for said single rotation an electrical signal may be developed representative of primary responses over a first angle of view through one of said sensitive areas, followed by primary response for a different angle of view through the other of said areas.

10. In combination, an optical line scanner comprising an optical element mounted for rotation about and focused substantially on an axis of rotation, energy-responsive means substantially on said axis and supported independently of rotation of said optics, said energy-responsive means including two sensitive areas in close adjacency and facing on predominant axes radiating from said rotation axis in angularly spaced relation, each said sensitive area developing an electrical output for variation in incident radiation, whereby during a single rotation said focusing element may be successively focused upon said sensitive areas, and switching means synchronized with rotation of said focusing elements and alternately sampling the outputs of said areas, whereby an electrical signal may be developed representative of primary response over a first angle of view through one of said sensitive areas, followed by primary response for a different angle of view through the other of said areas, display means connected to said switching means and responsive to said alternately sampled outputs for displaying the combined effective angular coverage of both said field widths, and means synchronizing the switching of said display means with rotation of said focusing elements about the rotary axis thereof.

11. The combination of claim 10, in which said display means includes a cathode ray oscillograph intensity-modulated with the commutated output of said switching means.

12. The combination of claim 10, in which said display means includes a stylus-operated recorder, and means for advancing electrically sensitive recording paper or the like transverse to the stylus-writing axis, said recorder being intensity-modulated by the commutated output of said switching means.

13. In combination, a rotatable optical scanner including focusing means mounted for rotation about and focused substantially on an axis of scanning rotation, a plurality of closely adjacent energy-responsive elements substantially on said axis and having predominant axes angularly spaced about said scanning axis, said elements being mounted independent of rotation of said scanner, whereby each of said elements may with said focusing means be said to have an angular field of view during a fraction of the rotary cycle of said scanner, said fields of view being adjacent and collectively covering substantially the full 360 degrees about said scanning axis, and display means for the outputs of said elements and including switching means synchronized with rotation of said scanner and sequentially connected to the respective outputs of said elements during a single rotation of said focusing means.

14. The combination of claim 13, in which said scanner includes a plurality of mirrors spaced from each other about the scanning axis.

15. The combination of claim 13, in which said scanner includes a plurality of angularly spaced lenses transparent to the radiation to which said elements are responsive.

16. The combination of claim 13, and including a shield occluding energy for a substantial fraction of the field about said axis, and means for rotating said shield about said scanning axis independently of scanner rotation.

17. In combination, a rotatable optical-scanner including focusing means mounted for rotation about and focused substantially on an axis of scanning rotation, six closely adjacent energy-responsive elements facing in directions spaced equally about said axis of scanning rotation, said elements being mounted independent of rotation of said scanner, and display means including a switch synchronized with scanner rotation and electrically commutating the outputs of said elements successively as said forcusing means is successively brought to bear on successive adjacent elements.

18. The combination of claim 17, in which said display means includes intensity-modulation means responsive to the commutated output of said switch and in which said display means includes a single scan-line sweep for the full 360-degree coverage of said scanner.

19. The combination of claim 17, in which said display means includes a plurality of separate intensity-modulated display devices representing different sectors of the 360-degree field of said scanner, in which said switch commutates the outputs of different elements to different of said display devices, and in which said display devices include sweep means synchronized with scanner rotation and phased therewith in accordance with the respective field sectors covered thereby.

20. Optical line-scanning means, comprising relatively fixed energy-responsive means including a plurality of small sensitive areas in close adjacency and in equal angularly inclined relationship, each said area developing an electrical output for variations in incident radiation, and optics including a plurality of angularly spaced focusing elements mounted for unitary rotation about said sensitive areas and about a rotary axis passing substantially through said energy-responsive means, said focusing elements being focused substantially on said energy-responsive means, the incremental angular inclination of the central axes of said elements with respect to each other being substantially equal to 360 degrees divided by the number of said focusing elements, whereby each focusing element may develop a first line of video signal in one sensitive area and an adjacent line of video signal in an adjacent sensitive area, display means, commutating means synchronized with rotation of said optics and coupling said display means alternately to said one and to said adjacent sensitive areas, and shield means mounted for independent rotation about said rotary axis and occluding energy from impingement on said energy-responsive means, said shield means having an effective angular width of at least substantially 180 degrees.

21. Optical line-scanning means, comprising relatively fixed energy-responsive means including a plurality of small sensitive areas in close adjacency and in equal angularly inclined relationship, said sensitive areas facing in directions spanning an overall angular spread less than 180 degrees, each said area developing an electrical output for variations in incident radiation, and optics including a plurality of angularly spaced focusing elements mounted for unitary rotation about said sensitive areas and about a rotary axis passing substantially through said energy-responsive means, said focusing elements being focused substantially on said energy-responsive means, the incremental angular inclination of the central axes of said elements with respect to each other being substantially equal to 360 degrees divided by the number of said focusing elements, whereby each focusing element may develop a first line of video signal in one sensitive area and an adjacent line of video signal in an adjacent sensitive area, display means and commutating means synchronized with rotation of said optics and coupling said display means alternately to said one and to said adjacent sensitive areas.

References Cited in the file of this patent

UNITED STATES PATENTS

| | | |
|---|---|---|
| 2,249,833 | James | July 22, 1941 |
| 2,378,744 | Annen | June 19, 1945 |
| 2,414,566 | Thomas | Jan. 21, 1947 |
| 2,421,192 | Engstrom | May 27, 1947 |
| 2,447,344 | Kliever | Aug. 17, 1948 |
| 2,510,093 | Ferguson et al. | June 6, 1950 |
| 2,597,001 | Jaffe | May 20, 1952 |
| 2,604,601 | Menzel | July 22, 1952 |
| 2,606,245 | Hall | Aug. 5, 1952 |
| 2,651,842 | Otto | Sept. 15, 1953 |
| 2,678,581 | Reisner | May 18, 1954 |
| 2,744,200 | Taylor | May 1, 1956 |
| 2,794,361 | Shaffer | June 4, 1957 |